United States Patent
Ghaffari et al.

(10) Patent No.: US 10,988,097 B2
(45) Date of Patent: Apr. 27, 2021

(54) RETRACTABLE PEDAL ASSEMBLY FOR A VEHICLE

(71) Applicant: GM Global Technology Operations LLC, Detroit, MI (US)

(72) Inventors: Ali Ghaffari, Rochester, MI (US); Steven J. Weber, Mt. Clemens, MI (US); Tomasz R. Warzecha, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 16/373,782

(22) Filed: Apr. 3, 2019

(65) Prior Publication Data

US 2020/0317152 A1 Oct. 8, 2020

(51) Int. Cl.
| | |
|---|---|
| *B60T 7/06* | (2006.01) |
| *G05D 1/00* | (2006.01) |
| *F16H 19/00* | (2006.01) |
| *B60R 21/09* | (2006.01) |

(52) U.S. Cl.
CPC ............... *B60R 21/09* (2013.01); *B60T 7/06* (2013.01); *F16H 19/001* (2013.01); *G05D 1/0061* (2013.01)

(58) Field of Classification Search
CPC ......... B60R 21/06; B60R 21/09; B60K 26/02; B60K 26/021; B60K 2026/026; B60K 2026/027; F16H 19/001; F02D 11/02; G05G 1/44; G05G 1/40; G05G 1/405; B60T 7/06; B60T 7/042; B60T 2220/04; B60W 30/182; G05D 1/0242; G05D 1/0257; G05D 1/0276
See application file for complete search history.

(56) References Cited

U.S. PATENT DOCUMENTS

| | | | | |
|---|---|---|---|---|
| 5,632,183 A | * | 5/1997 | Rixon | B60K 26/021 74/512 |
| 5,970,817 A | * | 10/1999 | Ichiba | B60T 7/06 74/512 |
| 6,182,525 B1 | * | 2/2001 | Bowers | B60K 20/02 180/274 |

(Continued)

FOREIGN PATENT DOCUMENTS

JP 2018-92336 A * 6/2018

*Primary Examiner* — Vinh Luong
(74) *Attorney, Agent, or Firm* — Quinn IP Law

(57) ABSTRACT

An automotive vehicle includes a body having a passenger compartment and a pedal assembly disposed within the passenger compartment. The pedal assembly includes a housing and at least one pedal coupled to the housing and the at least one pedal is actuatable by an occupant. The vehicle also includes an actuator operably coupled to the pedal and enclosed within the housing. The actuator is configured to selectively move the pedal relative to the housing between a first position and a second position with respect to the passenger compartment. The vehicle further includes at least one controller in communication with the actuator. The controller is configured to, in response to satisfaction of a first operating condition, control the actuator to move the pedal to the first position, and, in response to satisfaction of a second operating condition, control the actuator to move the pedal to the second position.

13 Claims, 7 Drawing Sheets

(56) References Cited

U.S. PATENT DOCUMENTS

| | | | |
|---|---|---|---|
| 2015/0253804 A1* | 9/2015 | Baur | G05G 1/40 180/329 |
| 2019/0129462 A1* | 5/2019 | Kim | G05G 1/44 |
| 2019/0176785 A1* | 6/2019 | Hansmann | B60T 13/741 |
| 2019/0302827 A1* | 10/2019 | Wojciechowski | B60R 21/09 |
| 2019/0310678 A1* | 10/2019 | Wojciechowski | B60T 7/06 |
| 2019/0315322 A1* | 10/2019 | Goto | B60T 13/66 |
| 2020/0317167 A1* | 10/2020 | Ghaffari | G05D 1/0061 |

* cited by examiner

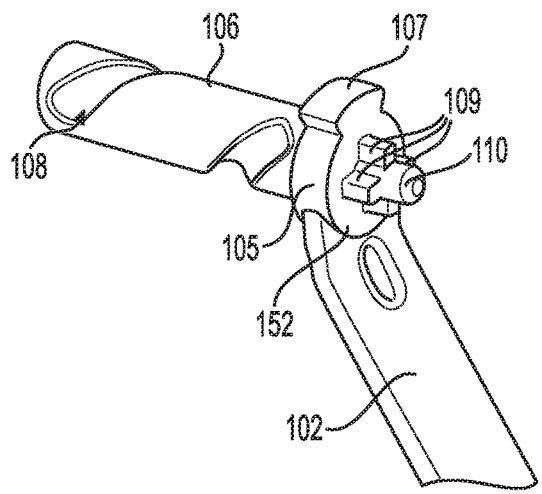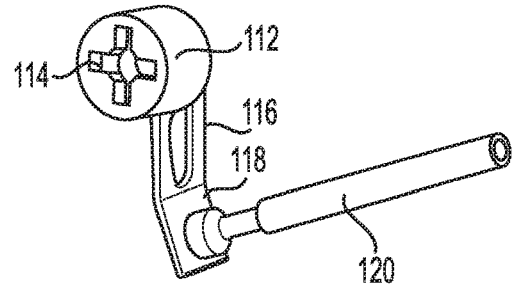
FIG. 3　　　　　　　FIG. 4
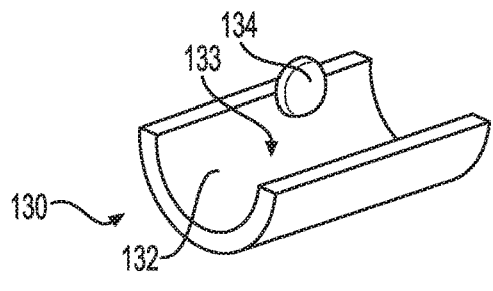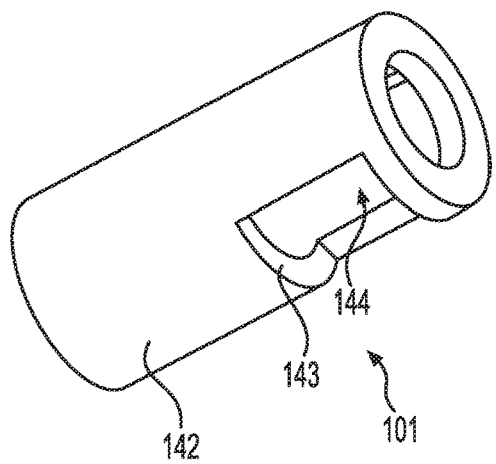
FIG. 5　　　　　　　FIG. 6
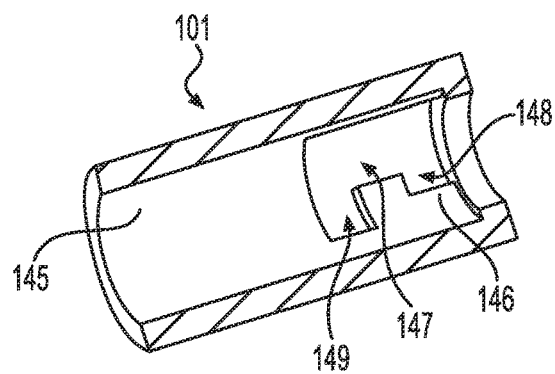
FIG. 7

# RETRACTABLE PEDAL ASSEMBLY FOR A VEHICLE

INTRODUCTION

The present disclosure relates generally to retractable and stowable pedal assemblies.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Embodiments according to the present disclosure provide a number of advantages. For example, the present disclosure provides a system and method for providing control interfaces to a vehicle operator when useful and moving such control interfaces out of the operator's way when unnecessary, thereby avoiding unintentional control inputs and increasing occupant comfort.

An automotive vehicle according to the present disclosure includes a body having a passenger compartment and a pedal assembly disposed within the passenger compartment. The pedal assembly includes a housing and at least one pedal coupled to the housing and the at least one pedal is actuatable by an occupant. The vehicle also includes an actuator operably coupled to the pedal and enclosed within the housing. The actuator is configured to selectively move the pedal relative to the housing between a first position with respect to the passenger compartment and a second position with respect to the passenger compartment. The vehicle further includes at least one controller in communication with the actuator. The controller is configured to, in response to satisfaction of a first operating condition, control the actuator to move the pedal to the first position, and, in response to satisfaction of a second operating condition, control the actuator to move the pedal to the second position.

In some aspects, the vehicle further includes a stowing member coupled to the pedal and operatively coupled to the actuator, wherein the stowing member includes a helical groove in engagement with the actuator such that translation of the actuator drives the stowing member in translation and rotation.

In some aspects, the vehicle additionally includes an alignment member coupled to the pedal and the housing includes a recessed area configured to receive the alignment member such that when the alignment member is engaged within a first area of the recessed area the pedal is actuatable by the occupant and when the alignment member is engaged within a second area of the recessed area the pedal is in a stowed position.

In some aspects, the pedal assembly of the vehicle further includes a retaining member coupled to the pedal, the pedal including a retention member and the retaining member including an opening such that the retention member is removably engageable with the opening.

In some aspects, the first operating condition includes an automated driving system not controlling vehicle driving behavior and the second operating condition includes the automated driving system controlling vehicle driving behavior.

In some aspects, the first position of the pedal is a deployed position and the second position of the pedal is a stowed position.

A pedal assembly for a vehicle according to the present disclosure includes a hollow cylindrical housing including a recessed area on an interior surface of the housing and an opening through the housing opposite to the recessed area, and at least one pedal actuatable by an occupant. The pedal includes a pedal arm, a pedal interface, an alignment member, at least one retention member, and a stowing member. The stowing member is enclosed within the housing and the pedal arm extends through the opening in the housing. The pedal assembly additionally includes a retaining member operably and removably coupled to the pedal. The pedal assembly further includes an actuator enclosed within the housing and operably coupled to the pedal. The actuator is configured to selectively move the pedal between a deployed position with respect to the housing and a stowed position with respect to the housing and is configured to actuate the pedal to the deployed position in response to a deploy command from a controller and to actuate the pedal to the stowed position in response to a stow command from the controller.

In some aspects, the alignment member includes a tab moveable and engageable within the recessed area of the housing.

In some aspects, the recessed area is configured to receive the alignment member such that when the alignment member is engaged within a first area of the recessed area the pedal is actuatable by the occupant and when the alignment member is engaged within a second area of the recessed area the pedal is in the stowed position.

In some aspects, the retention member is removably engageable with the retaining member.

In some aspects, the controller is configured to generate the deploy command in response to satisfaction of a first operating condition and to generate the stow command in response to satisfaction of a second operating condition.

In some aspects, the first operating condition comprises an automated driving system not controlling vehicle driving behavior and the second operating condition comprises the automated driving system controlling vehicle driving behavior.

In some aspects, the stowing member comprises a helical groove in engagement with the actuator such that translation of the actuator drives the stowing member in translation and rotation to actuate the pedal between the deployed position and the stowed position.

In some aspects, the retaining member comprises a retention opening configured to receive the retention member.

In some aspects, translation of the actuator initially drives the stowing member in translation to disengage the retention member from the retaining member and further translation of the actuator drives the stowing member in rotation to position the pedal in the stowed position.

A method of controlling an automotive vehicle according to the present disclosure includes providing a vehicle with a first actuator configured to control vehicle acceleration or braking, a controller configured to selectively control the first actuator in an autonomous mode according to an automated driving system, a pedal assembly having a housing and at least one pedal at least partially enclosed within the housing, and a second actuator enclosed within the housing and operably coupled to the pedal. The method additionally includes, in response to the controller controlling the first actuator in the autonomous mode, automatically controlling the second actuator, via the controller, to actuate the pedal to a stowed position. The method further includes, in response to the controller not controlling the first actuator in the autonomous mode, automatically controlling the second actuator, via the controller, to actuate the pedal to a deployed position.

BRIEF DESCRIPTION OF THE DRAWINGS

The present disclosure will be described in conjunction with the following figures, wherein like numerals denote like elements.

FIG. 3 is a schematic partial view of a pedal arm of the pedal assembly of FIG. 2, according to an embodiment.

FIG. 4 is a schematic view of a push rod and retainer of the pedal assembly of FIG. 2, according to an embodiment.

FIG. 5 is a schematic view of an actuator of the pedal assembly of FIG. 2, according to an embodiment.

FIG. 6 is a schematic view of a housing of the pedal assembly of FIG. 2, according to an embodiment.

FIG. 7 is a schematic partial view of the housing of FIG. 6, according to an embodiment.

Figure 1:
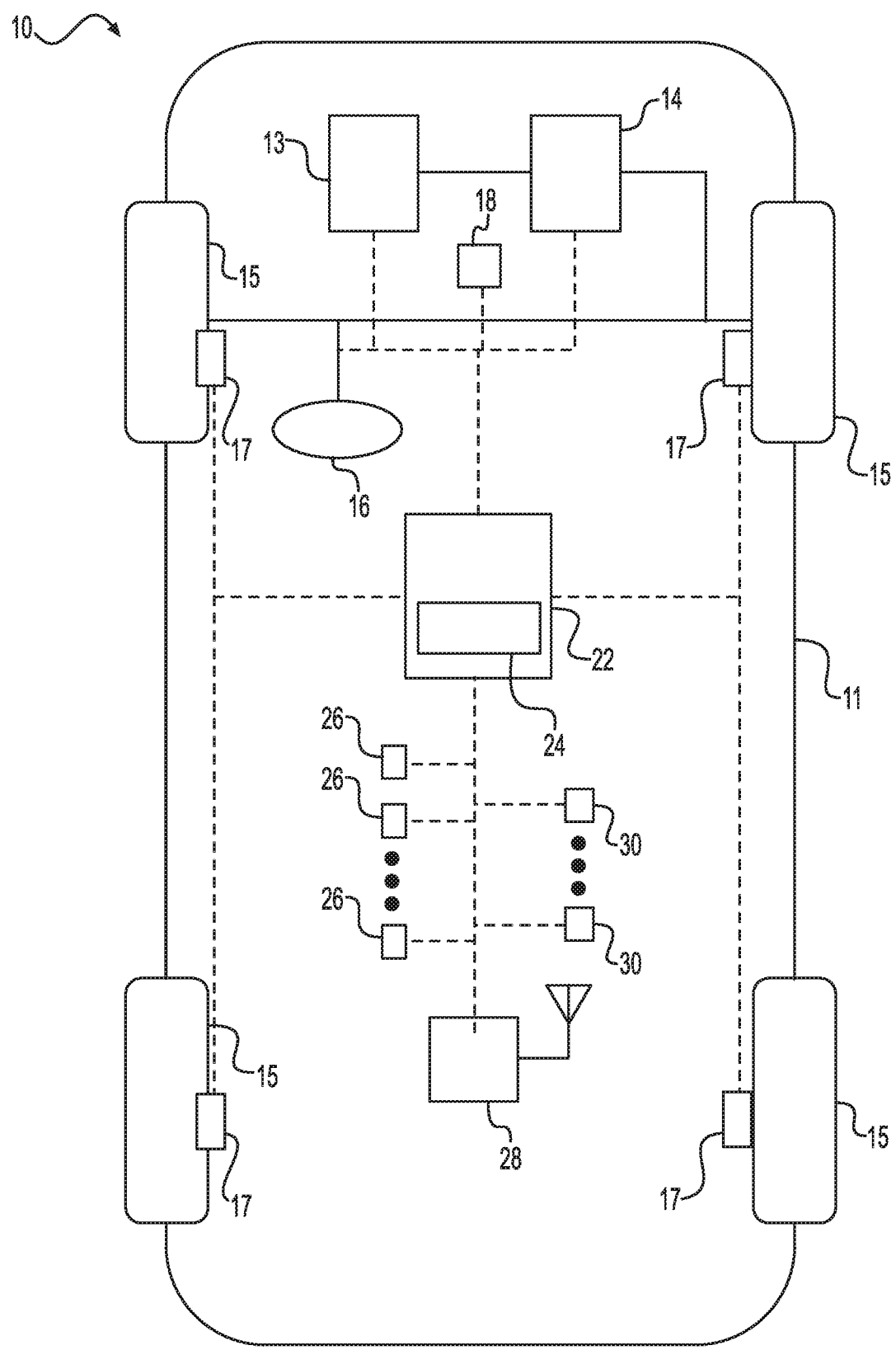
FIG. 1 is a schematic diagram of a vehicle according to an embodiment of the present disclosure.
Figure 2:
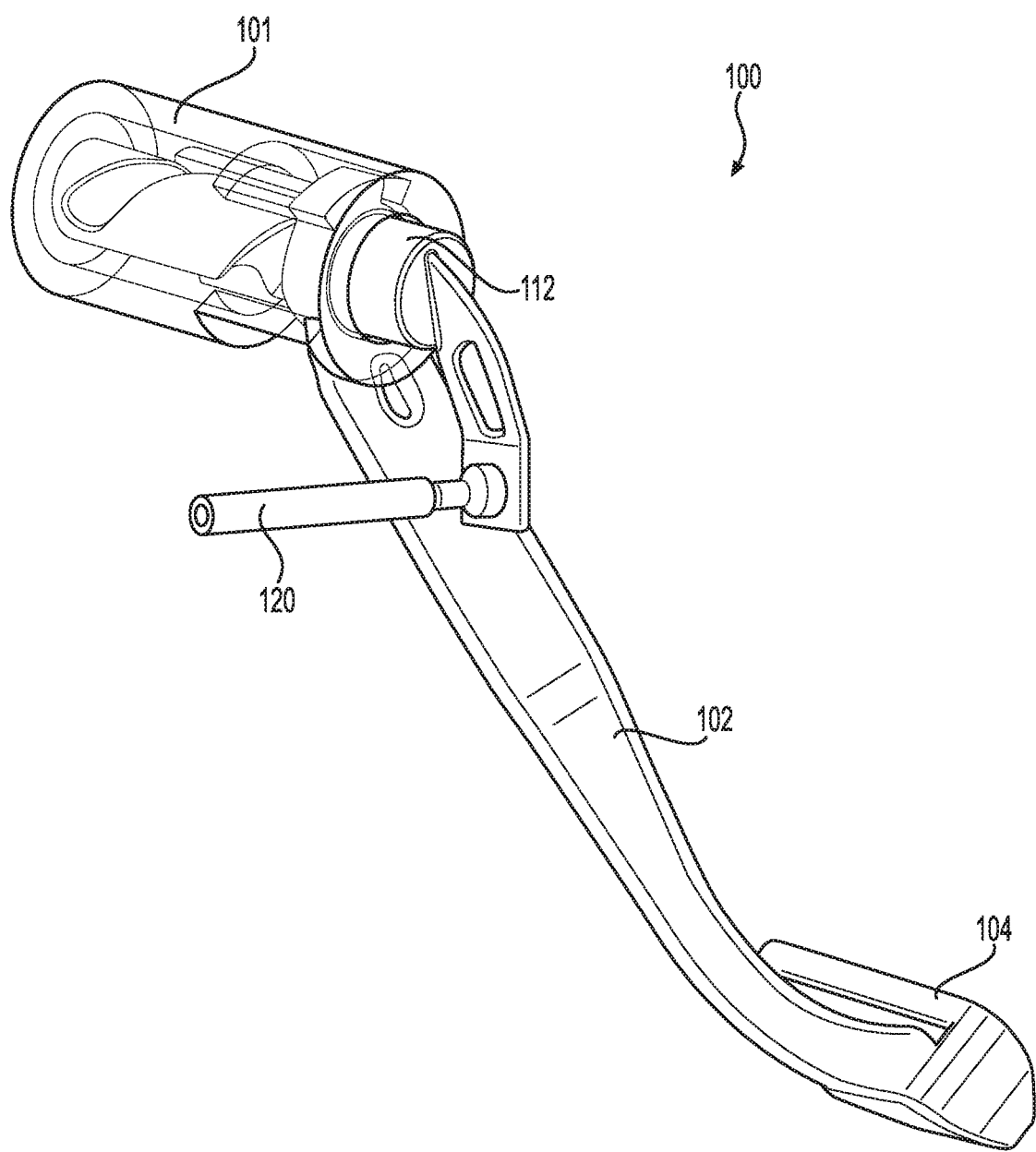
FIG. 2 is a schematic view of a pedal assembly, according to a first embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. The vehicle 10 includes a propulsion system 13, which may in various embodiments include an internal combustion engine, an electric machine such as a traction motor, and/or a fuel cell propulsion system.

The vehicle 10 generally includes a body 11 and wheels 15. The body 11 encloses the other components of the vehicle 10 and also defines a passenger compartment. The wheels 15 are each rotationally coupled to the body 11 near a respective corner of the body 11.

The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems. In various embodiments, the braking system includes a primary brake actuator and a secondary brake actuator configured to create torque at each wheel brake 17 by various methods including, for example and without limitation, electromechanical hydraulic pressure, electromechanical clamping force and/or other braking methods. In some embodiments, the primary and secondary brake actuators are in electronic communication with a brake control module. In some embodiments, each of the primary and secondary brake actuators are in communication with a single brake control module. In other embodiments, the primary and secondary brake actuators are each in electronic communication with a separate brake control module. In some embodiments, each brake control module includes an electronic brake controller.

The vehicle 10 additionally includes at least one pedal assembly 18. In an exemplary embodiment, the at least one pedal assembly 18 includes a first pedal, which may be referred to as an accelerator pedal, for controlling the propulsion system 13 and a second pedal, which may be referred to as a brake pedal, for controlling the wheel brakes 17.

In various embodiments, the vehicle 10 also includes a wireless communication system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, wheel brakes 17 via the brake control module(s), and pedal assembly 18 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 via one or more brake control modules to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

In the illustrated embodiment, the vehicle 10 is a so-called dual mode vehicle, capable of being operated by a human driver or by the ADS 24. When the vehicle 10 is under the control of a human driver, control interfaces such as a steering wheel and the at least one pedal assembly 18 should be accessible by the human driver. However, when the vehicle 10 is under the control of the ADS 24, human operation of such control interfaces may be unnecessary, undesirable, or both.

In the embodiments of the pedal assembly discussed herein, a mechanized input rod retainer enables the pedal arm to disengage from the input rod. The mechanized retainer allows the pedal to be retracted and stowed when it is not required for braking, such as, for example and without limitation, when the vehicle 10 is operated in an autonomous or semi-autonomous mode and is operated by the ADS 24.

Referring now to FIGS. 2-7, a pedal assembly 100 according to an embodiment of the present disclosure is illustrated. The pedal assembly 100 includes a pedal housing 101, a pedal including a pedal arm 102 and a pedal interface 104, and a retaining member 112. The pedal arm 102 is configured to rotate relative to the pedal housing 101 when depressed by an operator. The pedal arm 102 is also configured to rotate and translate relative to the pedal housing 101 when actuated into a stowed configuration, as discussed herein. In an exemplary embodiment, the pedal arm 102 is coupled to a helical stowing member 106 via an interface portion 105. The helical stowing member 106 is enclosed by and translates within the housing 101, as discussed herein. The helical stowing member 106 includes a groove 108 formed in the outer surface of the stowing member 106. The groove 108 forms a helical channel in the stowing member 106.

With reference to FIG. 3, in some embodiments, the helical stowing member 106 is substantially orthogonal to the pedal arm 102. The helical stowing member 106 and the pedal arm 102 are coupled via the interface portion 105. In some embodiments, the interface portion 105 includes an alignment member 107. In some embodiments, the alignment member 107 is a tab that extends from an edge of the interface portion 105 and interfaces with the pedal housing 101 as discussed herein. In some embodiments, the alignment member 107 is positioned opposite to the pedal arm 102; that is, the alignment member 107 extends in a first direction from the interface portion 105 and at least a portion of the pedal arm 102 extends in a second direction opposite the first direction. In some embodiments, the pedal arm 102, the interface portion 105, and the helical stowing member 106 are integrally formed from a single material, such as a casting or a molding. In other embodiments, the pedal arm 102, the interface portion 105, and the helical stowing member 106 are joined together by any type of mechanical or chemical means, such as welding or fastening.

The interface portion 105 also includes at least one retention member 109 and a retention hub 110. The embodiment shown in FIG. 3 includes four retention members 109 evenly distributed and surrounding the retention hub 110 in a cross or "x" pattern (three retention members 109 are shown in FIG. 3); however various embodiments may include more or fewer retention members. The retention member 109 and the retention hub 110 extend from a first face 152 of the interface portion 105 opposite a second face. The helical stowing member 106 extends from the second face of the interface portion 105.

With reference to FIG. 4, the retention member 109 and the retention hub 110 are received within a retaining member 112. The retaining member 112 includes a retention opening 114 configured to receive the at least one retention member 109 and the retention hub 110 such that the retention member 109 and retention hub 110 are slidably and removably engageable with the retention opening 114. The retention opening 114 is configured to complement and accommodate the shape of the retention member 109 and hub 110 extending from the first face 152 of the interface portion 105. The retaining member 112 may be press-fit to the interface portion 105 or may be secured to the interface portion 105 using any other means.

The retaining member 112 also includes an arm 116 and an interface plate 118. The arm 116 extends from the retaining member 112 such that a first end is adjacent to the retaining member 112 and a second end opposite the first end is adjacent to the interface plate 118. In some embodiments, the interface plate 118 forms an angle with the arm 116.

As shown in FIG. 4, a push rod 120 interfaces with the interface plate 118. The push rod 120 couples the pedal assembly 100 to a brake pedal emulator of the brake system, in some embodiments. Depression of the pedal arm 102 rotates the retaining member 112 via the coupling between the retention member 109 and the retention opening 114. The resulting actuation of the retaining member 112 results in translation of the push rod 120 to generate an instruction to engage the brake system. Similarly, release of the pedal arm 102 rotates the retaining member 112 in the opposite direction and results in translation of the push rod 120 to generate an instruction to disengage the brake system. In various embodiments, the instructions are generated by the brake control module and/or the controller 22.

With reference now to FIGS. 5 and 6, an actuator 130 includes a body 132 and an actuating member 134. The actuator 130 is enclosed within the housing 101 and at least partially encircles the stowing member 106 such that the actuating member 134 is aligned with the groove 108. In some embodiments, the actuator 130 is a semi-cylindrical body 132 including a half-spherical actuator member 134 positioned on an inside surface 133 of the body 132. The actuating member 134 is configured to interface with the groove 108. Actuation of the actuator 130 initially translates the stowing member 106 within the housing 101 to disengage the retention member 109 and the hub 110 from the retaining member 112. Further actuation of the actuator 130 results in travel of the actuating member 134 within the groove 108 to rotate the stowing member 106. Rotation of the stowing member 106 results in rotation of the pedal arm 102 between a first position to a second position. In some embodiments, the first position is a position in which the pedal assembly 100 is accessible and controllable by an operator and the second position is a position in which the pedal assembly 100 is stowed during operation of the vehicle by the ADS 24, for example and without limitation. The actuator 130 is in communication with or under the control of the controller 22. The actuator 130 may comprise an electric motor, an accumulator, other suitable actuator type, or any combination thereof.

The actuator 130 is selectively operable according to at least a first mode and a second mode based on commands from the controller 22. In an exemplary embodiment, the actuator 130 is provided with a transmission configured to selectively transmit force from the actuator 130 to the stowing member 106.

With continued reference to FIGS. 6 and 7, the housing 101 includes a housing body 142. The housing body 142 is a hollow cylindrical member configured to enclose the actuator 130 and the stowing member 106. The housing body 142 includes an edge 143 defining an opening 144. The pedal arm 102 extends through the opening 144. The opening 144 is configured to allow the pedal arm 102 to rotate relative to the housing 101 when depressed by an operator. Additionally, the opening 144 is configured to allow the pedal arm 102 to translate and rotate relative to the housing 101 when the stowing member 106 is acted on by the actuator 130.

With reference to the partial section view of the interior of the housing 101 shown in FIG. 7, an edge 146 formed in the interior surface 145 defines a recessed area 147. In some embodiments, the recessed area 147 forms a "C" shape. The recessed area 147 includes a first area 148 and a second area 149 axially spaced apart from the first area 148. The recessed area 147 is configured to receive the alignment member 107 extending from the interface portion 105 of the pedal arm 102. As shown in FIG. 7, the recessed area 147 is formed on an opposite side of the housing 101 from the opening 144. However, in other embodiments, the opening 144 and the recessed area 147 are relatively positioned in the housing 101 to accommodate the relative positions of the pedal arm 102 and the alignment member 107.

Translation and rotation of the stowing member 106 within the housing 101 due to actuation of the actuator 130 results in translation and rotation of the alignment member 107 within the recessed area 147. When the alignment member 107 is within the first recessed area 148, the pedal arm 102 is in a first position, that is the pedal arm 102 is positioned to allow depression by the operator and the alignment member 107 rotates within the first area 148 but does not translate relative to the housing 101. When the alignment member 107 is in the second recessed area 149, the pedal arm 102 is a second position, that is a stowed position.

Figure 8:
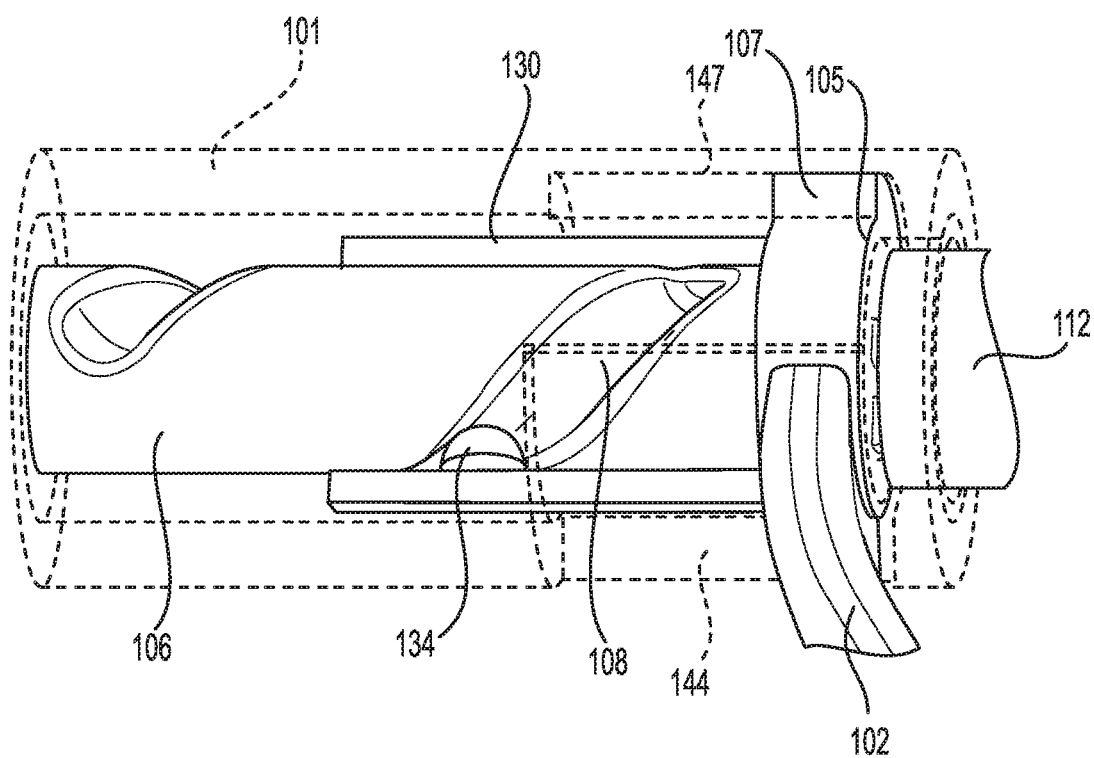
FIG. 8 is a schematic partial side view of the housing of FIG. 6, according to an embodiment.

FIG. 8 illustrates a side view of the housing 101 of the pedal assembly 100 with the housing 101 shown in phantom. The housing 101 encloses the stowing member 106 and the interface portion 105 of the pedal arm 102, as well as the actuator 130. The actuator 130 at least partially encircles the stowing member 106 and is positioned relative to the stowing member 106 such that the actuating member 134 is positioned within the groove 108.

Control of the actuator 130 by the controller 22 initially translates the stowing member 106 within the housing 101 to release the retention member 109 and the hub 110 from the retaining member 112. That is, as shown in FIG. 8, the actuator 130 translates the stowing member 106 to the left. As the stowing member 106 translates within the housing 101, the alignment member 107 translates within the recessed area 147 and the pedal arm 102 translates within the opening 144.

Once the retention member 109 and the retention hub 110 are disengaged from the retaining member 112, in some embodiments, further actuation of the actuator 130 results in rotation of the stowing member 106 due to travel of the actuating member 134 within the groove 108. The rotation of the stowing member 106 moves the pedal arm 102 to the stowed position. While the embodiment shown in FIGS. 2-8 illustrates both translation and rotation as part of the stowing process, in various embodiments the stowing member 106 and the housing 101 are configured such that the pedal arm 102 is translated to the stowed position without rotation.

Figure 9:
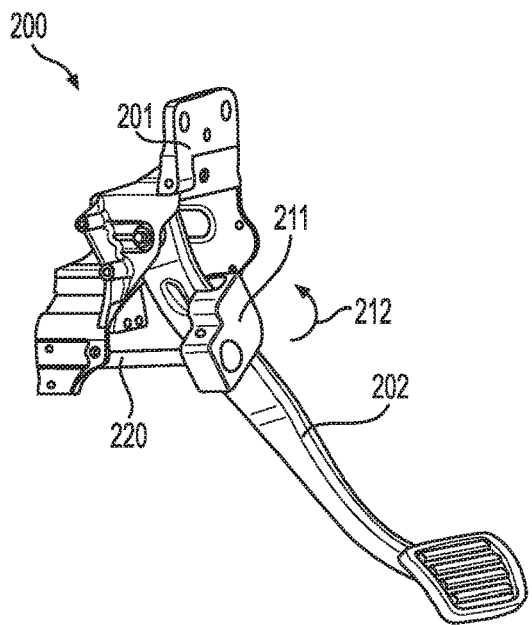
FIG. 9 is a schematic view of a pedal assembly, according to a second embodiment of the present disclosure.
Figure 10:
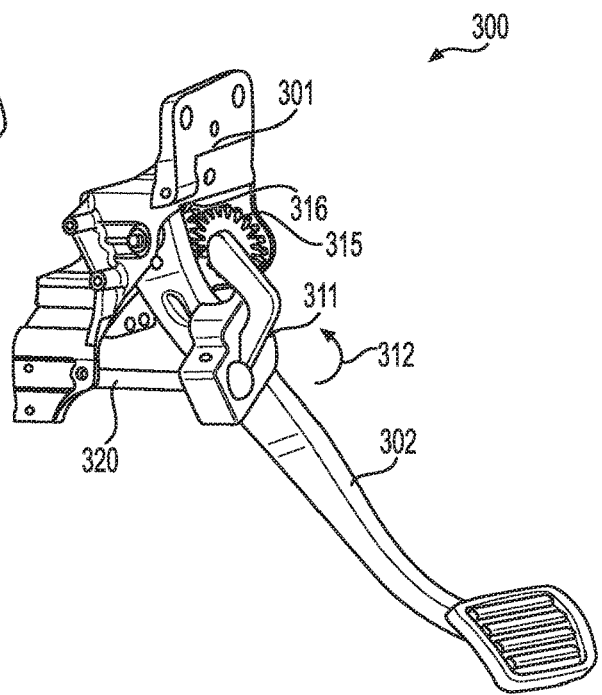
FIG. 10 is a schematic view of a pedal assembly, according to a third embodiment of the present disclosure.
Figure 11:
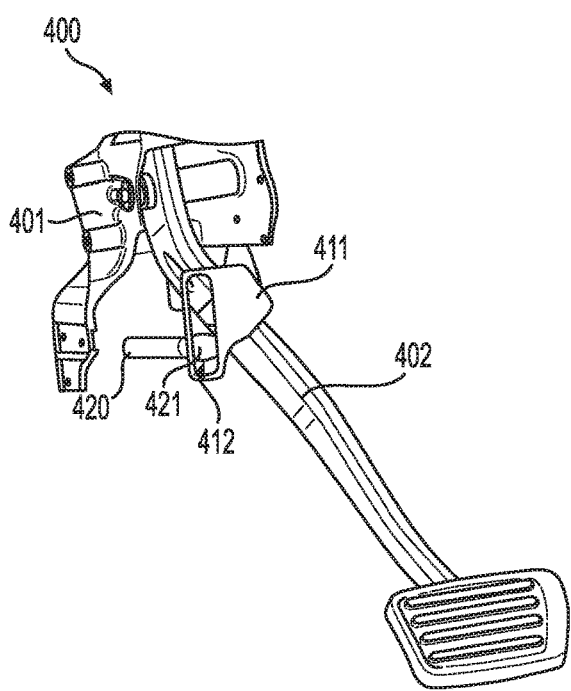
FIG. 11 is a schematic view of a pedal assembly, according to a fourth embodiment of the present disclosure.

FIGS. 9-11 illustrate several additional embodiments of a retractable and stowable pedal assembly. FIG. 9 illustrates a pedal assembly 200 according to an embodiment. The pedal assembly 200 includes a pedal arm 202 rotatably coupled to a pedal assembly housing 201. A push rod 220 couples the pedal assembly 200 to the brake system, in some embodiments.

A retainer 211 couples the pedal arm 202 and the push rod 220. The retainer 211 is rotatably coupled to the pedal arm 202. The retainer 211 includes a groove configured to accommodate the pedal arm 202. The retainer 211 further includes a recess configured to accommodate an end of the push rod 220. When the retainer 211 is in a first position, such as that shown in FIG. 9, depression of the pedal arm 202 applies force to the push rod 220 via the retainer 211.

A first actuator (not shown) rotates the retainer 211 in the direction shown by arrow 212 such that the retainer 211 disengages from the push rod 220. A second actuator (not shown) then translates the pedal arm 202 between a deployed position and a stowed position. Both of the first and second actuators may be in communication with or under the control of the controller 22. Each of the first and second actuators may comprise an electric motor, an accumulator, other suitable actuator type, or any combination thereof. In various embodiments, the first and second actuators may be controlled sequentially or simultaneously.

With reference to FIG. 10, another embodiment of a pedal assembly 300 is illustrated. The pedal assembly 300 includes a pedal arm 302 rotatably coupled to a pedal assembly housing 301. A push rod 320 couples the pedal assembly 300 to the brake system, in some embodiments.

A retainer 311 couples the pedal arm 302 and the push rod 320. The retainer 311 includes a groove configured to accommodate the pedal arm 302. The retainer 311 further includes a recess configured to accommodate an end of the push rod 320. When the retainer 311 is in a first position, such as that shown in FIG. 10, depression of the pedal arm 302 applies force to the push rod 320 via the retainer 311.

The retainer 311 is coupled to a first gearing element 315. The first gearing element 315 is in meshing engagement with a second gearing element 316. The second gearing element 316 is coupled to the pedal arm 302. The first and second gearing elements 315, 316 are rotatably coupled to the pedal assembly housing 301. An actuator (not shown) may be operatively coupled to the second gearing element 316 via a chain, belt, or any other suitable connection. The actuator may apply torque to the second gearing element 316 and, in turn, thereby apply torque to the retainer 311 such that the retainer 311 disengages from the push rod 320 by rotating away from the push rod 320 as illustrated by the arrow 312. Additionally, rotation of the second gearing element 316 translates the pedal arm 302 between a deployed position and a stowed position. The actuator may be in communication with or under the control of the controller 22. The actuator may comprise an electric motor, an accumulator, other suitable actuator type, or any combination thereof.

FIG. 11 illustrates another embodiment of a pedal assembly 400. The pedal assembly 400 includes a pedal arm 402 rotatably coupled to a pedal assembly housing 401. A push rod 420 couples the pedal assembly 400 to the brake system, in some embodiments. The push rod 420 includes a head element 421. The head element 421 includes two axially extending lobes such that the push rod 420 forms a "T" shape.

A retainer 411 couples the pedal arm 402 and the push rod 420. The retainer 411 may be integrally formed with the pedal arm 402 or may be coupled to the pedal arm 402. The retainer 411 further includes a slot 412. The slot 412 is configured to accommodate translation of the retainer 411 relative to the push rod 420 when the lobes of the head element 421 are longitudinally aligned with the slot 412 and to engage with the push rod 420 when the lobes of the head element 421 are orthogonally aligned with the slot 412. When the retainer 411 is in a first position, such as that shown in FIG. 11, depression of the pedal arm 402 applies force to the push rod 420 via the retainer 411.

The push rod 420 is operatively coupled to a first actuator (not shown). The first actuator may apply torque to the push rod 420 such that the push rod 420 rotates relative to the retainer 411. The first actuator applies torque to the push rod 420 such that rotation of the push rod 420 longitudinally aligns the lobes of the head element 421 with the slot 412. A second actuator (not shown) is operatively coupled to the pedal arm 402. The second actuator provides a motive force to move the pedal arm 402 between a plurality of positions between a deployed position and a stowed position. As the pedal arm 402 moves between the deployed position and the stowed position, the head element 421 of the push rod 420 passes through the slot 412. Each of the first and second actuators is in communication with or under the control of the controller 22. Each of the first and second actuators may comprise an electric motor, an accumulator, other suitable actuator type, or any combination thereof.

Figure 12A:
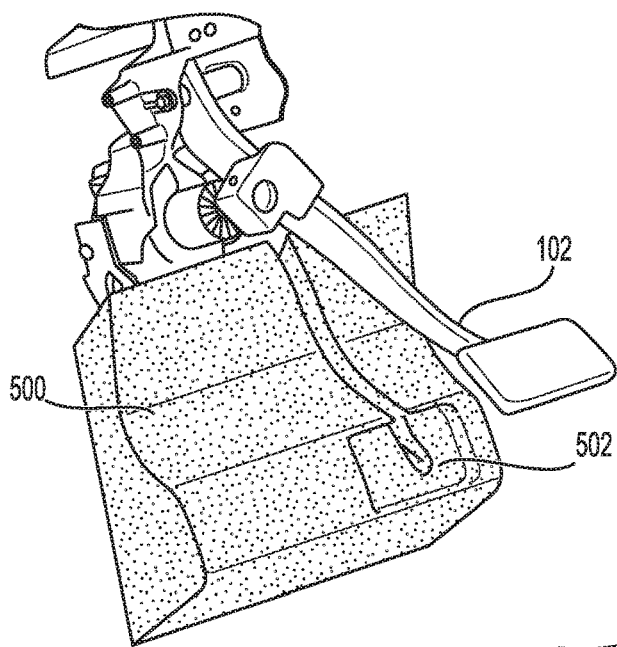
FIG. 12A is a schematic view of a stowing assembly and a first step of a stowing process, according to an embodiment.
Figure 12B:
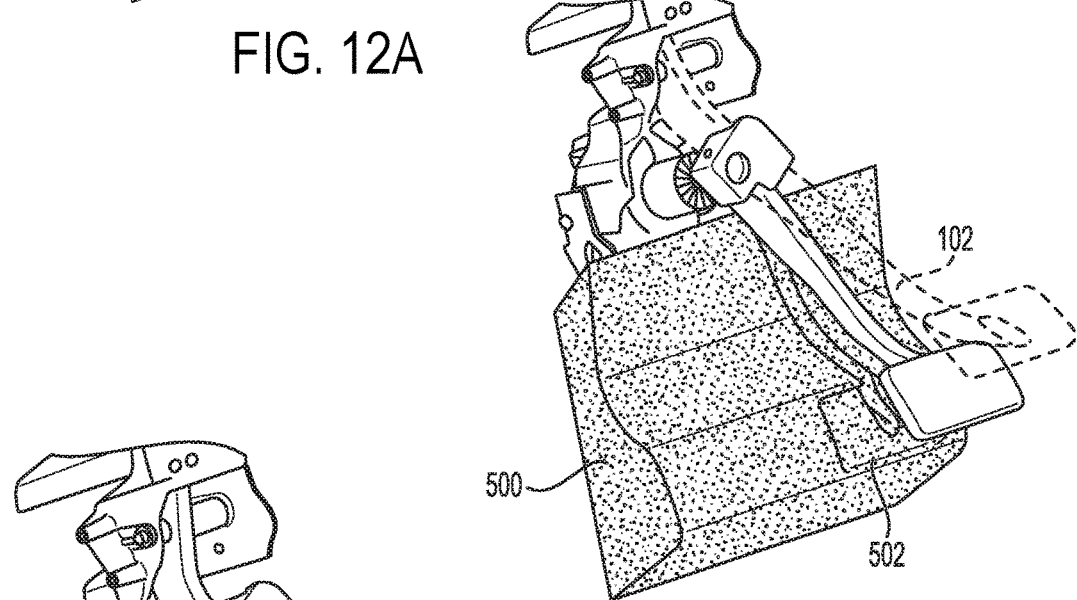
FIG. 12B is a schematic view of a second step of the stowing process, according to an embodiment.
Figure 12C:
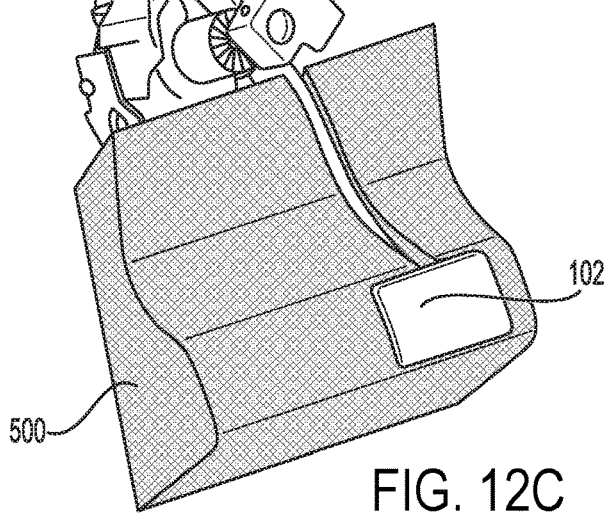
FIG. 12C is a schematic view of a third step of the stowing process, according to an embodiment.

FIGS. 12A-C illustrate three steps of a stowing process for a pedal assembly, such as the pedal assemblies 100, 200, 300, and 400 discussed herein, and a stowing panel configured to receive the pedal arm of the stowable pedal assembly. The stowing panel 500 includes a depression 502 configured to receive the pedal arm 102. The stowing panel 500 includes, in some embodiments, a backlight feature to indicate the relative progress of the stowing operation of the pedal arm 102.

FIG. 12A illustrates a first step of the stowing process for the pedal assembly 100. The pedal arm 102 is in a deployed position such that operator application of the pedal arm 102 controls vehicle braking. FIG. 12B illustrates the transition of the pedal arm 102 between the deployed position and the stowed position. In some embodiments, the backlight feature of the stowing panel 500 illuminates the stowing panel 500 in a color, such as yellow, for example and without limitation, to visually indicate the transitional state of the stowing process. FIG. 12C illustrates the pedal arm 102 in the stowed position within the depression 502. In some embodiments, the stowing panel 500 is illuminated in a second color, such as a green, for example and without limitation, to visually indicate to the operator that the stowing process is complete.

Figure 13:
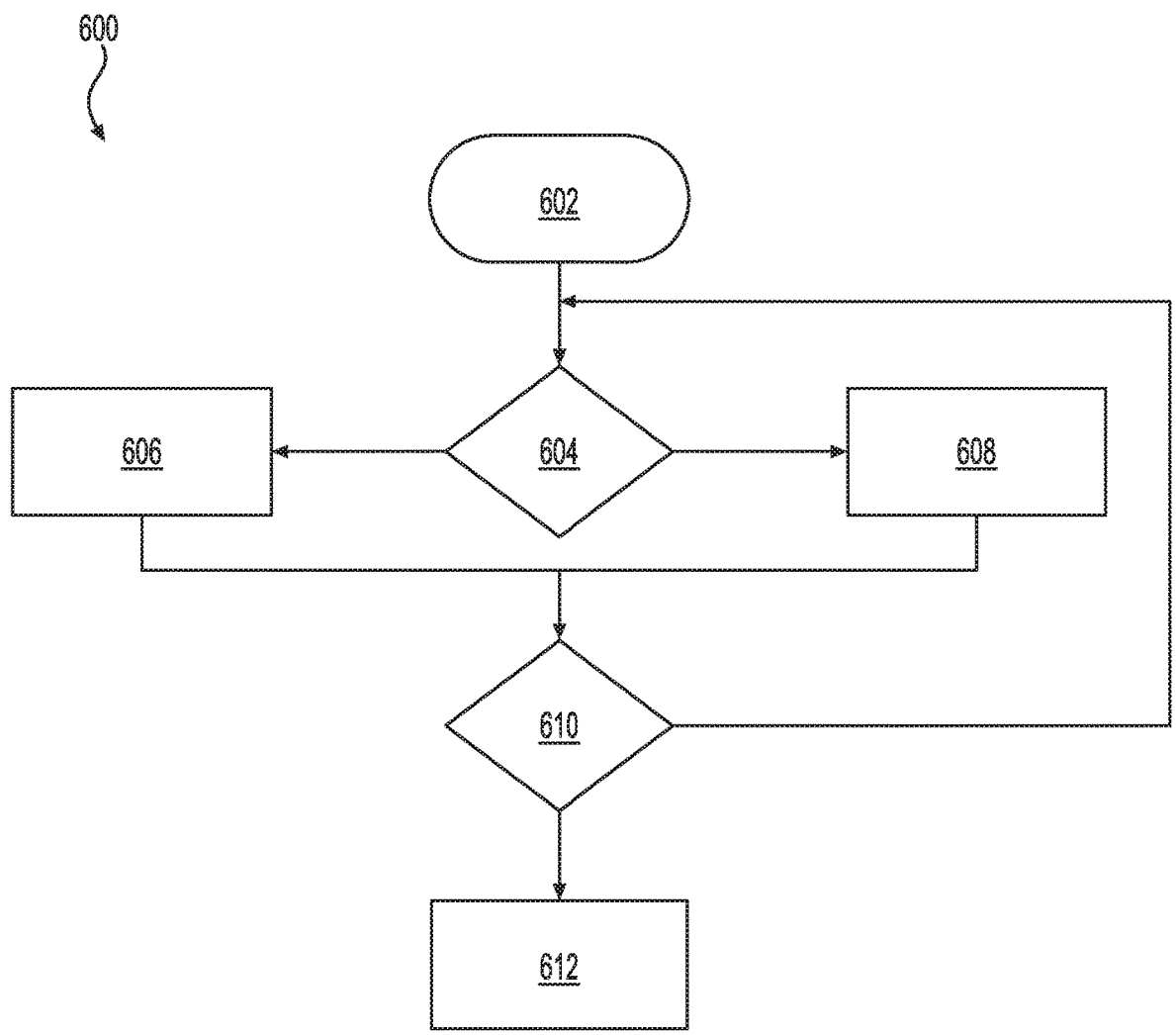
FIG. 13 is a flowchart representation of a method of controlling a vehicle, according to an embodiment.

Referring now to FIG. 13, a method 600 of controlling an automotive vehicle is illustrated in flowchart form. The method 600 can be utilized in connection with the controller 22 as discussed herein, or by other systems associated with or separate from the vehicle, in accordance with exemplary embodiments. The order of operation of the method 600 is not limited to the sequential execution as illustrated in FIG. 13, but may be performed in one or more varying orders, or steps may be performed simultaneously, as applicable in accordance with the present disclosure.

A vehicle drive cycle begins, as illustrated at block 602.

A determination is made of whether the vehicle is under the control of the ADS 24, as illustrated at operation 604. In an exemplary embodiment, this determination is made by the controller 22.

If the determination of operation 604 is positive, that is, the vehicle is under the control of the ADS 24, then the pedal assembly is controlled to a stowed position by the one or more actuators, as illustrated at block 606. This may be performed, for example, by the mechanisms and methods discussed above with respect to FIGS. 2-11. In some embodiments, the pedal assembly is stowed within a depression in a backlit stowing panel and the panel may be backlit in various colors to visually indicate to the operator the position of the pedal assembly through the stowing process, as discussed above with respect to FIGS. 12A-C.

If the determination of operation 604 is negative, that is, the vehicle is not under the control of the ADS 24, then the pedal assembly is controlled to or maintained at a deployed position, as illustrated at block 608.

Subsequent either block 606 or block 608, a determination is made of whether the drive cycle has terminated, as illustrated at operation 610. In an exemplary embodiment, this determination is made by the controller 22.

If the determination of operation 610 is negative, i.e. the drive cycle has not ended, then control returns to operation 604. The algorithm thus monitors ADS control of the vehicle and controls the pedal assembly accordingly unless and until the current drive cycle terminates.

If the determination of operation 610 is positive, i.e. the drive cycle has ended, then the pedal assembly is controlled to a default position, as illustrated at block 612. In an exemplary embodiment, the default position corresponds to the deployed position. However, in other embodiments the default position may correspond to the stowed position. The algorithm then terminates.

As may be seen the present disclosure provides a system and method for providing control interfaces to a vehicle operator when useful and moving such control interfaces out of the operator's way when unnecessary, thereby avoiding unintentional control inputs and increasing occupant comfort. Moreover, systems and methods according to the present disclosure may provide these benefits in a relatively compact package. In some embodiments, the pedal arm of the pedal assembly may be retracted to a stowed position with visual and/or other indicators provided to clearly communicate to the operator that the operator is no longer in control of the vehicle and cannot take over control via depression of the pedal arm. In some embodiments, operation of the vehicle in a manual driving mode, that is, the vehicle is not in an autonomous mode of operation and control of the vehicle is not provided by the controller, the pedal arm automatically transitions to the deployed position and a brake pedal emulator may be engaged to the pedal arm to allow pedal application by the operator.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent; the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
   a body having a passenger compartment;
   a pedal assembly disposed within the passenger compartment, the pedal assembly comprising a housing, at least one pedal directly coupled to the housing, and an alignment member coupled to the at least one pedal, the at least one pedal actuatable by an occupant, and wherein the housing comprises a recessed area configured to receive the alignment member such that when the alignment member is engaged within a first area of the recessed area the at least one pedal is actuatable by the occupant and when the alignment member is engaged within a second area of the recessed area the at least one pedal is in a stowed position;
   an actuator operably coupled to the at least one pedal and enclosed within the housing, the actuator being configured to selectively move the at least one pedal relative to the housing between a first position with respect to the passenger compartment and a second position with respect to the passenger compartment; and
   at least one controller in communication with the actuator, the at least one controller being configured to, in response to satisfaction of a first operating condition, control the actuator to move the at least one pedal to the first position, and, in response to satisfaction of a second operating condition, control the actuator to move the at least one pedal to the second position.

2. The automotive vehicle of claim 1 further comprising a stowing member coupled to the pedal and operatively coupled to the actuator, wherein the stowing member comprises a helical groove in engagement with the actuator such that translation of the actuator drives the stowing member in translation and rotation.

3. The automotive vehicle of claim 1, wherein the pedal assembly further comprises a retaining member coupled to the pedal, the pedal comprising a retention member and the retaining member comprising an opening such that the retention member is removably engageable with the opening.

4. The automotive vehicle of claim 1, wherein the first operating condition comprises an automated driving system not controlling vehicle driving behavior and wherein the second operating condition comprises the automated driving system controlling vehicle driving behavior.

5. The automotive vehicle of claim 4, wherein the first position of the pedal is a deployed position and the second position of the pedal is a stowed position.

6. A pedal assembly for a vehicle, comprising:
   a hollow cylindrical housing comprising a recessed area on an interior surface of the housing and an opening through the housing opposite to the recessed area;
   at least one pedal comprising a pedal arm, a pedal interface, an alignment member comprising a tab configured to move and engage within the recessed area of the housing, at least one retention member, and a stowing member, the stowing member enclosed within the housing and the pedal arm extending through the opening in the housing;
   a retaining member operably and removably coupled to the at least one pedal; and
   an actuator enclosed within the housing and operably coupled to the at least one pedal, the actuator configured to selectively move the at least one pedal between a deployed position with respect to the housing and a stowed position with respect to the housing, the actuator being configured to actuate the at least one pedal to the deployed position in response to a deploy command from a controller and to actuate the at least one pedal to the stowed position in response to a stow command from the controller.

7. The pedal assembly of claim 6, wherein the recessed area is configured to receive the alignment member such that when the alignment member is engaged within a first area of the recessed area the pedal is actuatable by the occupant and when the alignment member is engaged within a second area of the recessed area the pedal is in the stowed position.

8. The pedal assembly of claim 6, wherein the retention member is removably engageable with the retaining member.

9. The pedal assembly of claim 6, wherein the controller is configured to generate the deploy command in response to satisfaction of a first operating condition and to generate the stow command in response to satisfaction of a second operating condition.

10. The pedal assembly of claim 9, wherein the first operating condition comprises an automated driving system not controlling vehicle driving behavior and the second operating condition comprises the automated driving system controlling vehicle driving behavior.

11. The pedal assembly of claim 6, wherein the stowing member comprises a helical groove in engagement with the actuator such that translation of the actuator drives the stowing member in translation and rotation to actuate the pedal between the deployed position and the stowed position.

12. The pedal assembly of claim 11, wherein the retaining member comprises a retention opening configured to receive the retention member.

13. The pedal assembly of claim 12, wherein translation of the actuator initially drives the stowing member in translation to disengage the retention member from the retaining member and further translation of the actuator drives the stowing member in rotation to position the pedal in the stowed position.

\* \* \* \* \*